United States Patent
Allen, Jr. et al.

(10) Patent No.: US 7,281,348 B2
(45) Date of Patent: Oct. 16, 2007

(54) ICE FISHING APPARATUS WITH ECCENTRIC RELEASE FEATURE

(76) Inventors: George E. Allen, Jr., 15 Young St., Rochester, NH (US) 03867; Daniel J. Allen, 37 Broad St., Rochester, NH (US) 03867

( * ) Notice: Subject to any disclaimer, the term of this patent is extended or adjusted under 35 U.S.C. 154(b) by 0 days.

(21) Appl. No.: 11/031,883

(22) Filed: Jan. 7, 2005

(65) Prior Publication Data

US 2006/0150469 A1    Jul. 13, 2006

(51) Int. Cl.
  *A01K 85/01* (2006.01)
  *A01K 93/00* (2006.01)
  *A01K 97/12* (2006.01)

(52) U.S. Cl. .................. 43/17; 43/4.5; 43/16

(58) Field of Classification Search .......... 43/16, 43/17, 58; 242/612, 614, 310, 322, 323, 242/305, 306
  See application file for complete search history.

(56) References Cited

U.S. PATENT DOCUMENTS

| | | | | |
|---|---|---|---|---|
| 2,089,097 A | * | 8/1937 | Millett | 43/16 |
| 2,122,841 A | * | 7/1938 | Laurila | 43/16 |
| 2,448,346 A | | 8/1948 | Baugh et al. | |
| 2,565,379 A | * | 8/1951 | Hjalmar | 43/17 |
| 2,569,946 A | * | 10/1951 | Olesen et al. | 43/17 |
| 2,651,875 A | | 9/1953 | Brockman | |
| 2,834,140 A | * | 5/1958 | Knier | 43/17 |
| 2,908,100 A | * | 10/1959 | Mogren | 43/17 |
| 2,936,541 A | * | 5/1960 | Stanford | 43/17 |
| 2,977,704 A | * | 4/1961 | Tinsley | 43/17 |
| 3,196,570 A | * | 7/1965 | Borisch | 43/17 |
| 4,120,111 A | * | 10/1978 | Young, Jr. | 43/17 |
| 4,566,216 A | * | 1/1986 | Randall | 43/17 |
| 4,821,446 A | * | 4/1989 | Beaulieu, Jr. | 43/17 |
| 4,953,317 A | * | 9/1990 | Ruchel | 43/17 |
| 5,107,613 A | | 4/1992 | Hemmingsen | |
| 5,448,849 A | * | 9/1995 | Burgett | 43/17 |

\* cited by examiner

*Primary Examiner*—Teri Pham Luu
*Assistant Examiner*—Joshua Michener
(74) *Attorney, Agent, or Firm*—Davis Bujold & Daniels, P.L.L.C.

(57) ABSTRACT

An ice fishing trap comprising a main body supporting a rotatable spool for supporting a desired length of fishing line. An indicator, having both a set position and a triggered position, is supported by the main body. A release rod cooperates with the rotatable spool and, when the indicator is in its set position, and also cooperates with the indicator. The release rod has a first position in which the release rod captively retains the indicator in its set position and engages with the spool and the release rod has a second position, axially spaced from the first position, in which the release rod releases the indicator to permit the indicator to move to its triggered position, and rotation of the spool moves the release rod from its first position to its second position to actuate the indicator into its triggered position.

18 Claims, 11 Drawing Sheets

ICE FISHING APPARATUS WITH ECCENTRIC RELEASE FEATURE

FIELD OF THE INVENTION

The present invention relates to an ice fishing trap, also known as a tip-up trap, with a trigger mechanism which avoids sending a false signal to the operator of the fishing trap.

BACKGROUND OF THE INVENTION

A variety of ice fishing traps are known and available to consumers. A number of these known ice fishing traps are patented, for example, see U.S. Pat. Nos. 2,448,346, 2,565,379, 2,651,875, 2,908,100, 2,977,704 and 3,196,570.

One problem associated with all of the ice fishing traps heretofore known is that they do not reliable indicate to an operator, of the ice fishing trap, when a fish has taken the bait secured to the fishing line of the ice fishing trap. A typical problem is that the wind, snow and/or other environmental conditions inadvertently activate the ice fishing trap to "trigger" a flag and indicate to an operator that a fish has taken the bait. The traps are normally located within visible distance of the operator of the ice fishing traps and when a trap is "triggered", the operator must travel to the ice fishing trap to verify whether or not a fish has taken the bait, been caught and/or reset the trap.

SUMMARY OF THE INVENTION

Wherefore, it is an object of the present invention to provide an indicator or signal for an ice fishing trap which reliably indicates when a fish has taken the bait.

Another object of the present invention is to provide an arrangement in which a free end of the indicator is captively retained by the trigger mechanism and only released once the reel, supported by the ice fishing trap, has rotated a sufficient distance to release the indicator and signal to an operator that a fish has taken the bait.

A further object of the present invention is to provide an ice fishing trap which is able to withstand extreme wind, snow and other environmental conditions while avoid sending a false indication that a fish has taken the bait.

Yet another object of the present invention is to provide a trigger mechanism for the ice fishing trap which prevents freezing of the trigger mechanism so that the trigger mechanism it is able to function properly even under extreme temperature and wind conditions.

A further object of the present invention is to provide a trigger mechanism for an ice fishing trap which reliably indicates, without sending any false signal, that a fish has taken the bait.

The present invention also relates to an ice fishing trap comprising: a main body supporting a rotatable spool for supporting a desired length of fishing line; the main body supporting an indicator, and the indicator having both a set position and a triggered position; a release rod cooperating with the rotatable spool and, when the indicator is in its set position, also cooperating with the indicator, the release rod having a first position in which the release rod captively retains the indicator in its set position and engages with the spool, the release rod having a second position, axially spaced from the first position, in which the release rod releases the indicator to permit the indicator to move to its triggered position, and rotation of the spool axially moves the release rod from its first position to its second position and actuates the indicator into its triggered position.

The present invention also relates to an ice fishing trap comprising: a main body supporting a rotatable spool for containing a desired length of fishing line; the main body supporting an indicator, and the indicator having both a set position and a triggered position; a release rod having a second end cooperating with the rotatable spool and, at least when the indicator is in its set position, also having a first end cooperating with both a keeper and the indicator, the release rod having a first position in which the release rod, along with the keeper, captively retain the indicator in its set position and engages with the spool, the release rod having a second position, axially spaced from the first position, in which the release rod releases the indicator to permit the indicator to move to its triggered position; wherein rotation of the spool axially moves the release rod from its first position to its second position and actuates the indicator into its triggered position.

The present invention lastly relates to a method of actuating an ice fishing trap comprising a main body supporting a rotatable spool containing a desired length of fishing line; the main body supporting an indicator, and the indicator having both a set position and a triggered position; and a release rod cooperating with the rotatable spool and, when the indicator is in its set position, also cooperating with the indicator, the release rod having a first position in which the release rod captively retains the indicator in its set position and engages with the spool, the release rod having a second position, axially spaced from the first position, in which the release rod releases the indicator to permit the indicator to move to its triggered position, and rotation of the spool axially moves the release rod from its first position to its second position and actuates the indicator into its triggered position; the method comprising the steps of: securing bait to a free end of the fishing line; moving the release rod to its first position and captively engaging the indicator; and as the bait is being taken by a fish, rotating the spool to move the release rod axially from its first position to its second position.

BRIEF DESCRIPTION OF THE DRAWINGS

The invention will now be described, by way of example, with reference to the accompanying drawings in which.

DETAILED DESCRIPTION OF THE INVENTION

Figures 1, 1A, 1B:
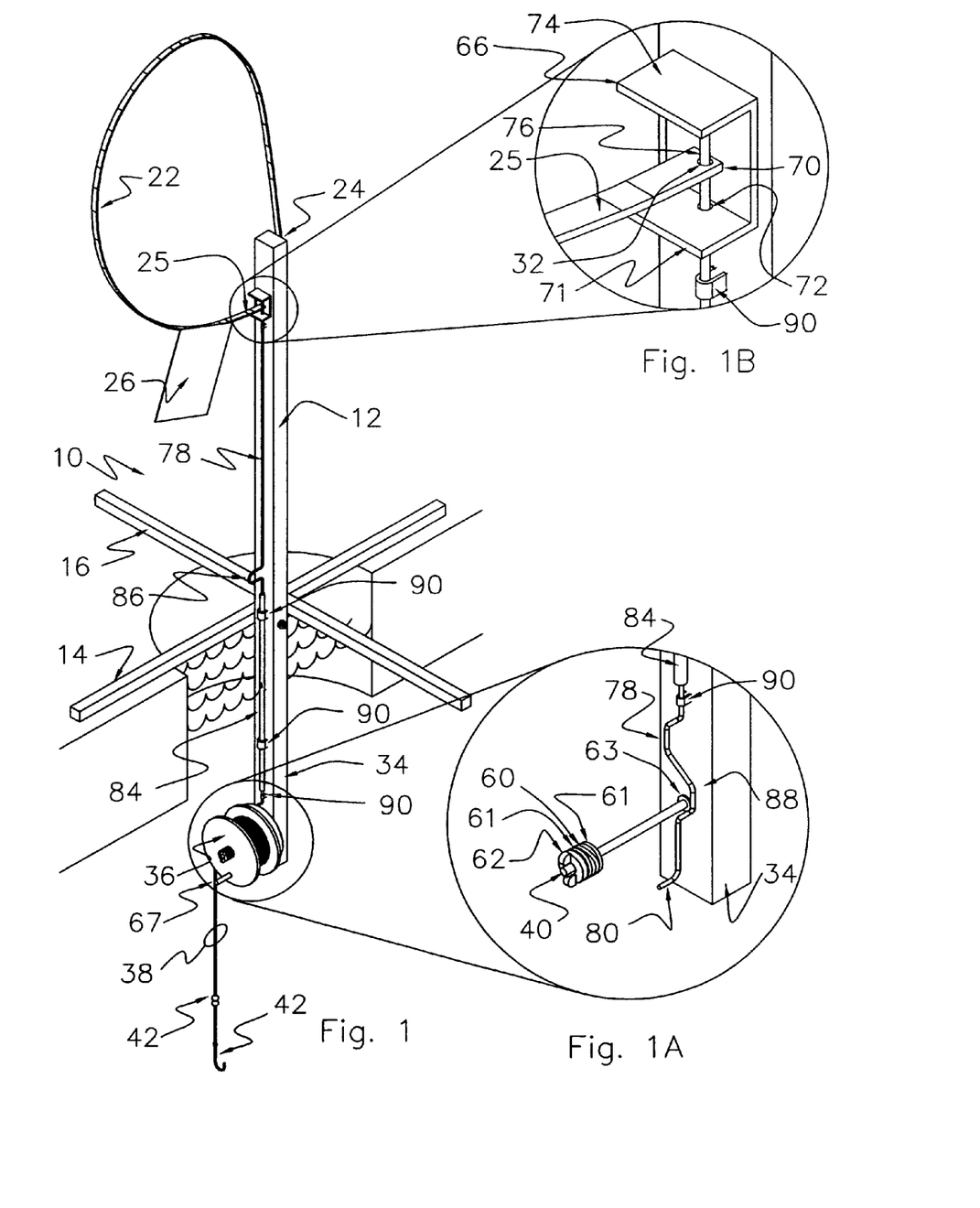
FIG. 1 is a diagrammatic perspective view showing the ice fishing trap, according to the present invention, in an in use position.
FIG. 1A is a diagrammatic exploded view of the rider and spool shaft components of FIG. 1 with the spool removed for reasons of clarity.
FIG. 1B is a diagrammatic exploded view of the release rod, keeper and indicator components of FIG. 1.
Figures 2, 2A, 2B:
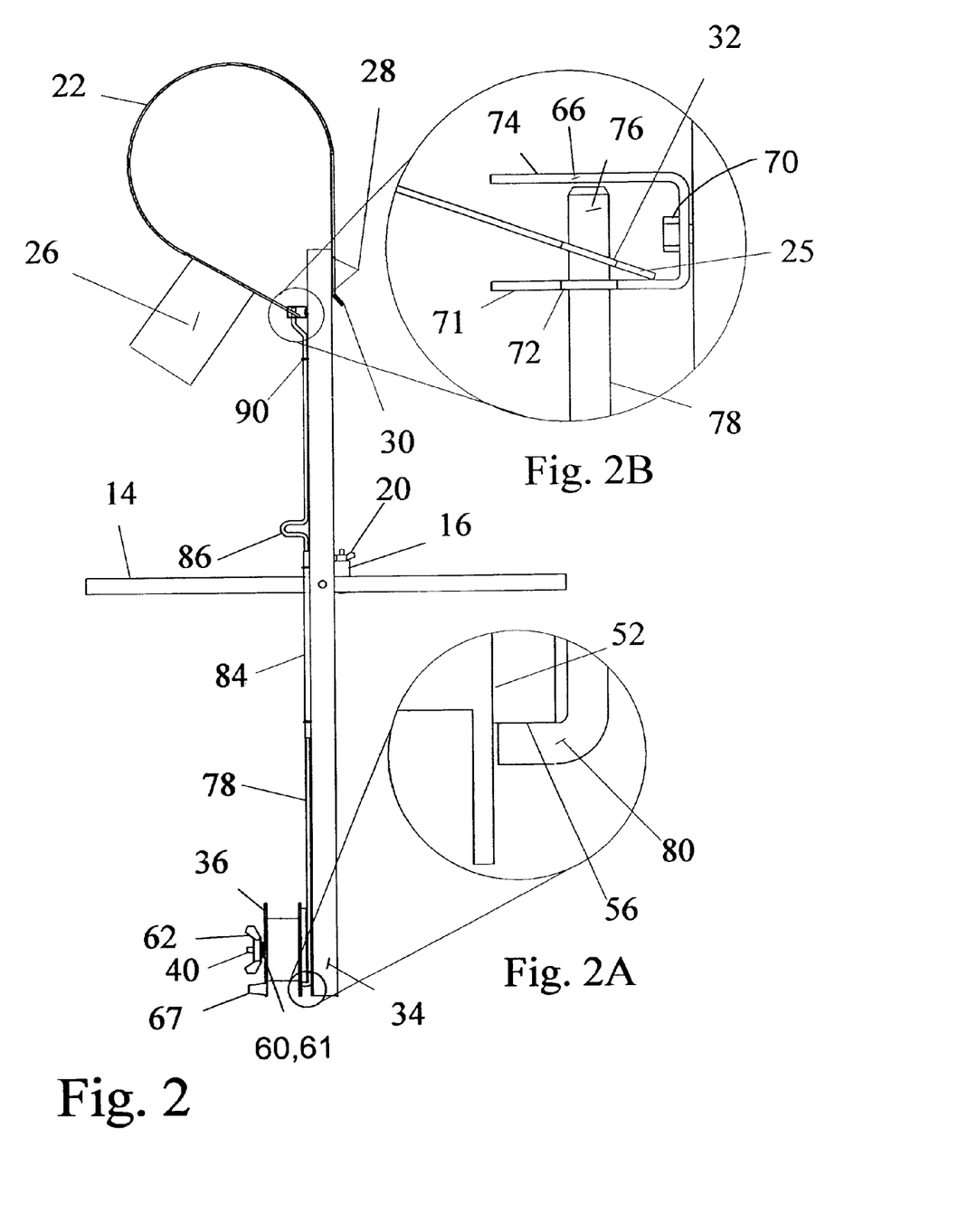
FIG. 2 is a diagrammatic front elevational view of the ice fishing trap showing the indicator in the set position.
FIG. 2A is a diagrammatic exploded view of the rider and spool components of FIG. 2.
FIG. 2B is a diagrammatic exploded view of the release rod, keeper and indicator components of FIG. 2.
Figure 2C:
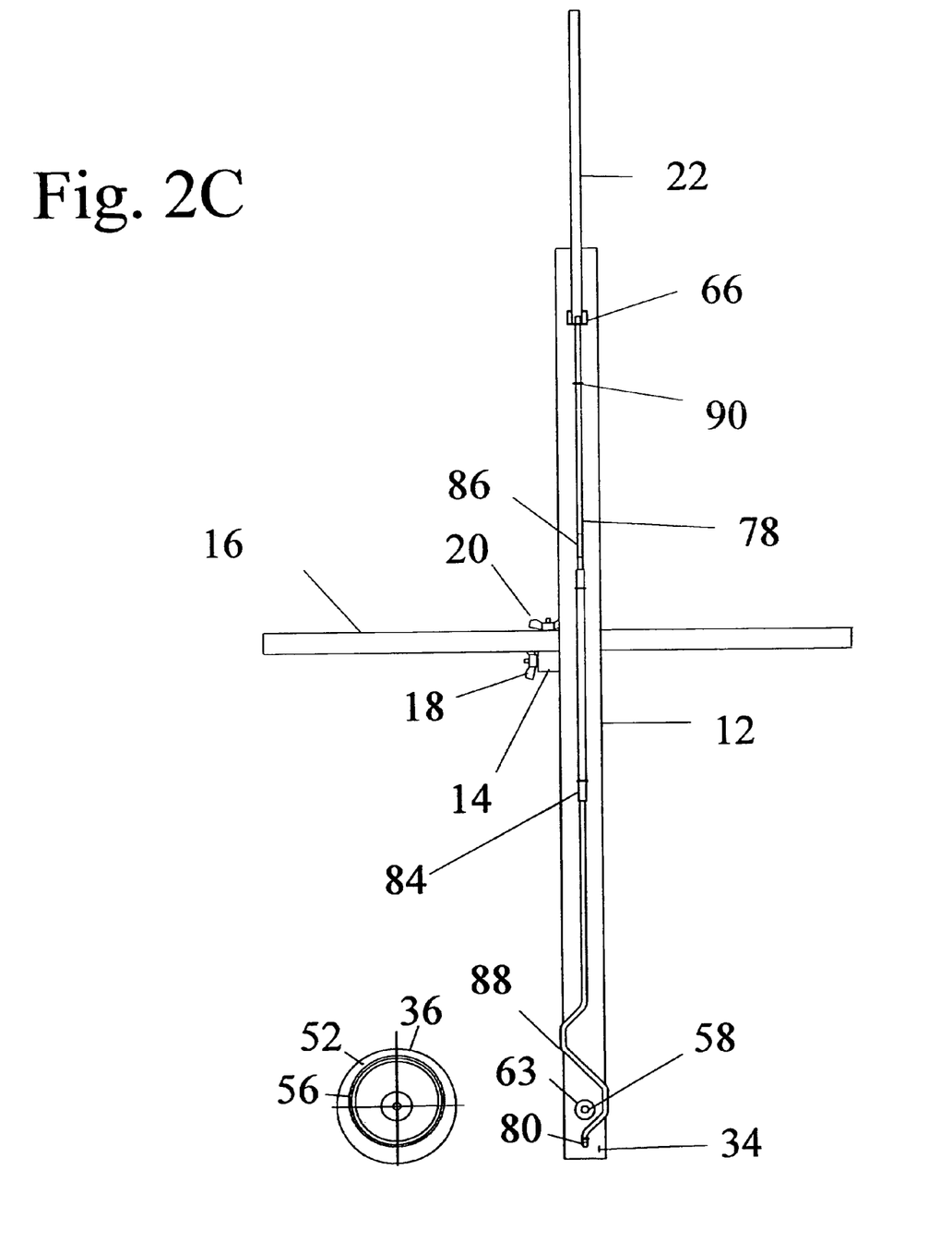
FIG. 2C is a diagrammatic left side elevational view of the ice fishing trap of FIG. 2 with the spool removed and flipped over to show the position of the eccentric rim.

Turning first to FIGS. 1-2C, a detailed description concerning the present invention will now be provided. As can be seen in that Figure, the ice fishing trap 10 generally comprises an elongate main shaft or body 12 which is typically manufactured from wood, metal, aluminum or fiberglass, etc. The lower mid section of the main body 12 is provided with a pair of pivotal or rotatable legs 14, 16. A middle portion of a first one 14 of the pair of legs is pivotally connected to an upper intermediate portion of the body 12 by a first conventional fastener 18, e.g., by a bolt and a wing nut, while a middle portion of the second leg 16 is pivotally connected to the middle portion of the second leg 14 by a second conventional fastener 20, e.g., by a bolt and a wing nut (see FIGS. 2 and 2C). The legs 14, 16 have a stowed position (not shown) in which both legs 14, 16 extend substantially parallel to one another and a longitudinal axis defined by the main body 12 and a deployed or operational position in which both legs 14, 16 extend substantially perpendicular to one another and the main body 12 to support the ice fishing trap 10 in a substantially vertical in use position (see FIG. 1).

Figures 3, 3A, 3B:
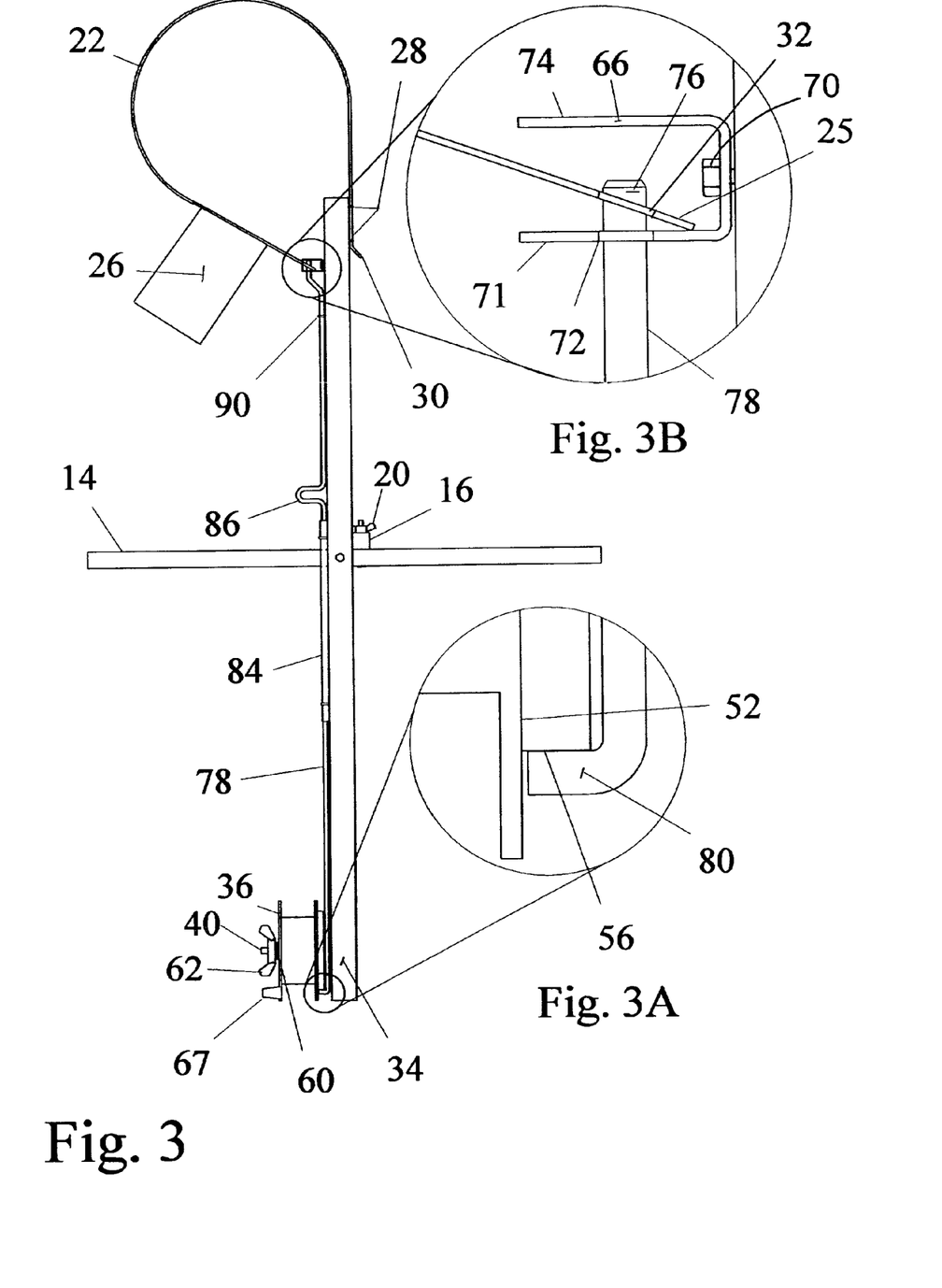
FIG. 3 is a diagrammatic front elevational view of the ice fishing trap showing the indicator in a partially triggered or a light set position.
FIG. 3A is a diagrammatic exploded view of the rider and spool components of FIG. 3.
FIG. 3B is a diagrammatic exploded view of the release rod, keeper and indicator components of FIG. 3.

The top end 24 of the main body 12 is provided with a resilient indicator 22, such as a flexible or bendable shaft, rod, member, component, etc. Preferably, the indicator 22 is secured to the top end 24 of the main body 12 in a manner which facilitates storage or removal thereof when the ice fishing trap 10 is to be stowed. The indicator 22 could be, for example, a thin elongate leaf spring or any other resilient and flexible member that is capable of being curved, bent, reconfigured or contoured into a generally circular configuration (see FIGS. 1-3C) when the ice fishing trap 10 is set, and is also capable of returning back to its normal substantially vertically unbiased position (see FIGS. 4 and 4C), once the trap has been activated or triggered, so that the indicator 22 extends generally parallel and coincident with the main body 12 and signals to the operator that a fish has taken the bait. As shown in the drawings, the free end 25 of the indicator 22 may be provided with a red, orange or some other readily visible colored flag 26 or some other readily visible component which helps signal to an operator, especially over a distance of a few hundred yards or so, whether the ice fishing trap 10 is still in a set position (see FIGS. 2 and 3) or has been trigger by a fish (see FIGS. 4 and 4C). A further detailed discussion concerning both setting and activation or triggering of the ice fishing trap 10 will be provided below.

According to one embodiment, the resilient indicator 22 is an elongate, flat thin piece of metal which is about 2 to 2.5 feet long. A rear surface of the top end 24 of the main body 12 has one or more U-shaped guide member(s) 28 which maintain the resilient indicator 22 secured to the body 12. The guide member(s) 28 captively surround and retain the resilient indicator 22 but allow it to side relatively thereto from a stowed position, in which the resilient indicator 22 is located substantially parallel and adjacent the main body 12, to a deployed position in which the resilient indicator 22 is located substantially parallel but extends from the top end 24 of the body 12. The trailing end of the resilient indicator 22 has stop member or feature 30 which prevents the resilient indicator 22 from being completely removed from the guide member(s) 28 while the flag 26, or other visible indicator, prevents the free end 25 of the resilient indicator 22 from being completely removed from the guide member(s) 28. The stop member or feature 30 and the flag 26 assist with captively retaining the resilient indicator 22. An opening 32, having a diameter of between ¹⁄₁₆ of an inch and ⅜ of an inch or so, is formed in the indicator 22 provided closely adjacent the free end 25 of the resilient indicator 22, adjacent the flag 26.

A spool 36 is rotatably supported by a base end 34 of the main body 12. The spool 36 is typically wound with a sufficient quantity of fishing line 38, e.g., about 25 feet to a few hundred feet or so of fishing line 38, and a spool shaft 40 couples the spool 36 to the main body 12. It is to be appreciated that the fishing line 38 may be wound about the spool 36 in either direction. A spool bolt or shaft 40 is coupled to the main body 12 and rotatably supports the spool 36 while still allowing the spool 36 to rotate relative to the body 12 for reeling in or dispensing additional fishing line 38. A trailing end of the fishing line 38 is secured to the spool 36, in a conventional manner, e.g., by tying that end to the spool for example, while the opposite leading end of the fishing line 38 supports conventional fishing hardware or tackle 42 such as a swivel, sinker, hook, etc. As such hardware or tackle 42 is conventional and well known in the art and does not form any part of the present invention per se, a further detailed discussion concerning the same is not provided.

Figure 5:
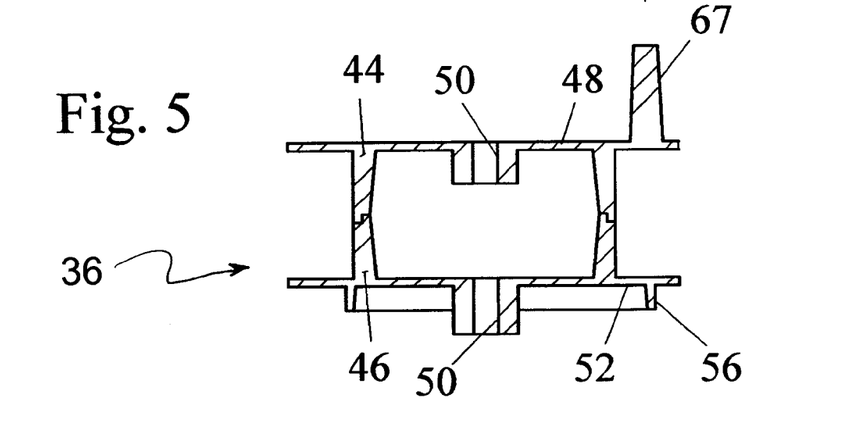
FIG. 5 is a diagrammatic cross sectional view of the spool of the ice fishing trap, according to the present invention.
Figure 5A:
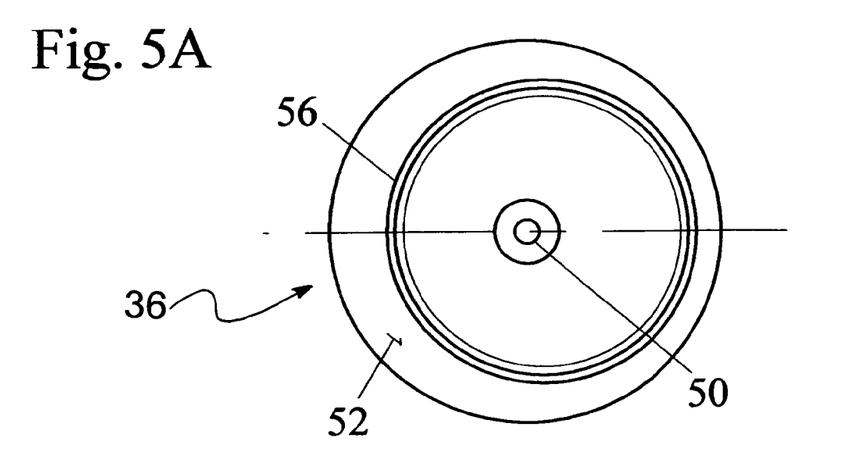
FIG. 5A is a diagrammatic right side view of the spool of FIG. 5.
Figure 5B:
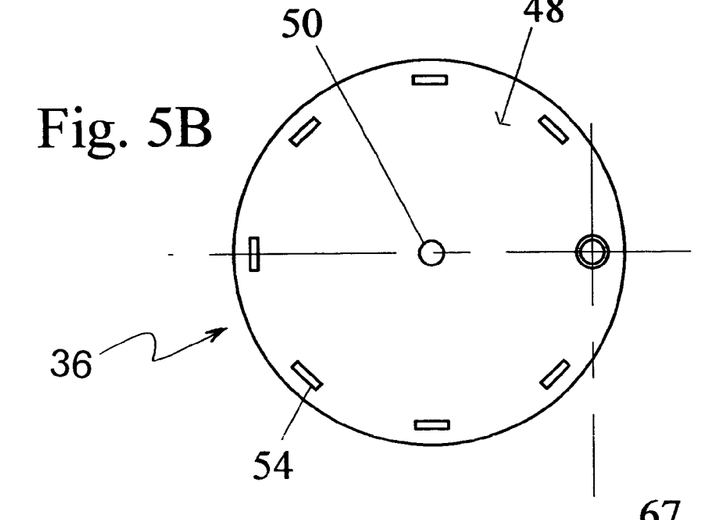
FIG. 5B is a diagrammatic left side elevational view of the spool of FIG. 5.

The spool 36 is preferably manufactured as two separately molded component 44, 46, as can be seen in FIG. 5, which mate with one another to form the spool 36. A sidewall 48 of a first one of the two mating components 44 is substantially circular in shape and has a centrally located rotational bore 50 formed therein while a sidewall 52 of the second one of the two mating components 46 is also substantially circular in shape and has a centrally located rotational bore 50 formed therein. The sidewall 48 may be provided with a plurality of spaced apart rectangularly shaped holes 54 which each facilitate retaining the fishing hook in a stowed position when the ice fishing trap 10 is not in use. The two sidewalls 48, 52 typically are substantially the same size. The second mating component 46 has an eccentrically rim 56 formed in an outwardly facing surface of its sidewall 52 and this eccentrically rim 56 is located eccentrically with respect to the rotational bore 50. That is, the eccentrically rim 56 of the second mating component 46 is slightly smaller in diameter than the diameter of the first and second sidewalls 48, 52, e.g., by between about ¼ inches and about ¾ inches or so, and is arranged so that as the spool 36 rotates about the spool shaft 40, the eccentrically rim 56 rotates in an eccentric fashion about the spool shaft 40.

The two spools mating components 44, 46 are connected to one another by glue, for example, to form a unitary spool 36 and, once so mated, the rotational bores 50 align with one another for receiving and engaging with the spool shaft 40 to thereby facilitate rotation of the spool 36 relative to the main body 12. One or more bearings (not shown) may be provide on the inwardly facing surface of the rotational bore 50 or the outwardly facing surface of the spool shaft 40 to facilitate the desired rotation of the spool 36. A spool bore 58 is formed in the lower end of the main body 12 and the spool shaft 40 extends through the spool bore 58 (see FIG. 2C) and the rotational bore 50 of the spool 36 to rotatable couple the spool 36 to the main body 12.

A pair of washers 61 sandwich a cup spring, a tension spring or some other spring member 60 therebetween and a threaded fastener 62 (see FIG. 1A), such as a wing nut or some other threaded fastening device, is attached to the free end of the spool shaft 40. If desired, a washer or a low friction member 63 can space the spool 36 from the main body 12 and assist with rotation of the spool 36 relative to the main body 12. The threaded fastener 62 is suitable tightened on the shaft 40 to retain the washers 61, spring member 60, the low friction member 63 (if present) and the spool 36 thereon. As the operator tightens the threaded fastener 62 further on the shaft 40, the washers 61, the spring member 60 and the spool 36 are forced toward the main body 12 and thereby increases the clamping force and rotational friction experienced by the spool 36 as it rotates in either direction relative to the main body 12. This fastening arrangement provides a "drag adjustment" feature for the spool 36, e.g., it facilitates adjustment of the amount of tension which must be applied to the fishing line 38 in order for the fishing line 38 to cause rotation of the spool 36 once a fish has taken the bait supported by the free end of the fishing line 38. It will be appreciated that other conventional tensioning devices and/or drag devices, which are well known in the art, could be utilized with the spool of the present invention, depending upon the particular application.

To facilitate rotation of the spool 36 by an operator in either rotational direction, the outwardly facing and exposed side surface of the spool 36 may be provided with a handle, crank or some other drive mechanism 67.

A keeper 66 is support adjacent the top end 24 of the main body 12. The keeper 66 is preferably a U-shaped bracket or some other component which has a securing hole (not shown in detail) provided in a base surface thereof to facilitate securing the keeper 66 to the main body 12 adjacent the top end 24 thereof by a screw or some other conventional fastener 70. A first one of the sidewalls 71 of the keeper 66 is provided with an aperture 72 therein which allows a latch 76 of a release rod 78 to pass therethrough and abut against an inwardly facing surface of an opposite sidewall 74 of the keeper 66 and captively retain the free end 25 of the indicator 22 therein, as will be describe below in further detail. The leading end of the latch 76 is provided with a chamfer, bevel or some other contoured surface to facilitate insertion of the latch 76 within the aperture 72 of the keeper 66. As will be appreciated by this arrangement, once the free end 25 of the indicator 22 is received by the keeper 66 and the latch 76 of the release rod 78 passes through the opening 32 provided in the free end 25 of the indicator 22 and abuts against the opposite sidewall 74 of the keeper 66, the free end 25 of the indicator 22 is captively received and retained by the latch 76 and the keeper 66 and thus cannot be inadvertently dislodged or removed therefrom, such as by the wind, snow or any other environmental condition(s) which typically have a tendency to dislodge indicators of other known ice fishing apparatuses and devices and thereby send a false signal to the operator thereof. Moreover, due to the relatively close spacing of the two opposed sidewalls 71, 74 of the keeper 66 from one another, the amount of required axial travel or movement of the latch 76 of the retainer rod 78 is minimized so that only a relatively small amount of rotation of the eccentric rim 56 of the spool 36 is required in order to move the release rod 78 a sufficient axial distance and release the indicator 22 to its triggered position.

The release rod 78 generally comprises generally an elongate and relatively thin rigid component, such as steel wire or some other similar durable but rigid member. As discussed briefly above, a first end of the release rod 78 includes the latch 76 which cooperates with the keeper 66 for assisting with captively retaining the indicator 22 in its set position. The second opposed end of the release rod 78 is bent into an L-shaped configuration and forms a rider 80 (see FIG. 1A) which engages with and rides along the eccentric rim 56 formed in the second sidewall 52 of the spool 36. An intermediate section of the release rod 78 is generally elongate and straight, i.e., does not have any curves, bends or transitions therein. This generally elongate and straight intermediate section of the release rod 78 is encased by and closely surrounded by a tubular element or sleeve 84, such as an aluminum tube or sleeve, a plastic tube or sleeve or some other tubular member. The tubular element or sleeve 84 should be sufficiently long, e.g., have a length of between a few inches to about 10 inches or so, so that a first portion of the tubular element or sleeve 84, during use, is submerged underwater while a second opposed portion of the tubular element or sleeve 84 remains above water (see FIG. 1). The tubular element or sleeve 84 functions to prevent ice from freezing around the release rod 78 and hindering or restricting axial movement, travel and/or operation of the release rod 78. Generally a pair of spaced apart conventional alignment members 90 are utilized to secure the tubular element or sleeve 84 to the main body 12.

Preferably a sharp bend or crimp is provided in the release rod 78, in the mid section of the release rod 78, and this sharp bend or crimp functions as a push lever 86 to facilitate the operator manually pushing the release rod 78 axially along the main body 12 toward the keeper 66 so that the latch 76 of the release rod 78 can cooperate with the keeper 66 and captively retain the indicator 22 in its set position. The push lever 86 also forms a stop which engages with the second portion of the tubular element or sleeve 84 to prevent the rider 80 from becoming spaced too far away from the eccentric rim 56 of the second sidewall of the spool 36.

Figure 3C:
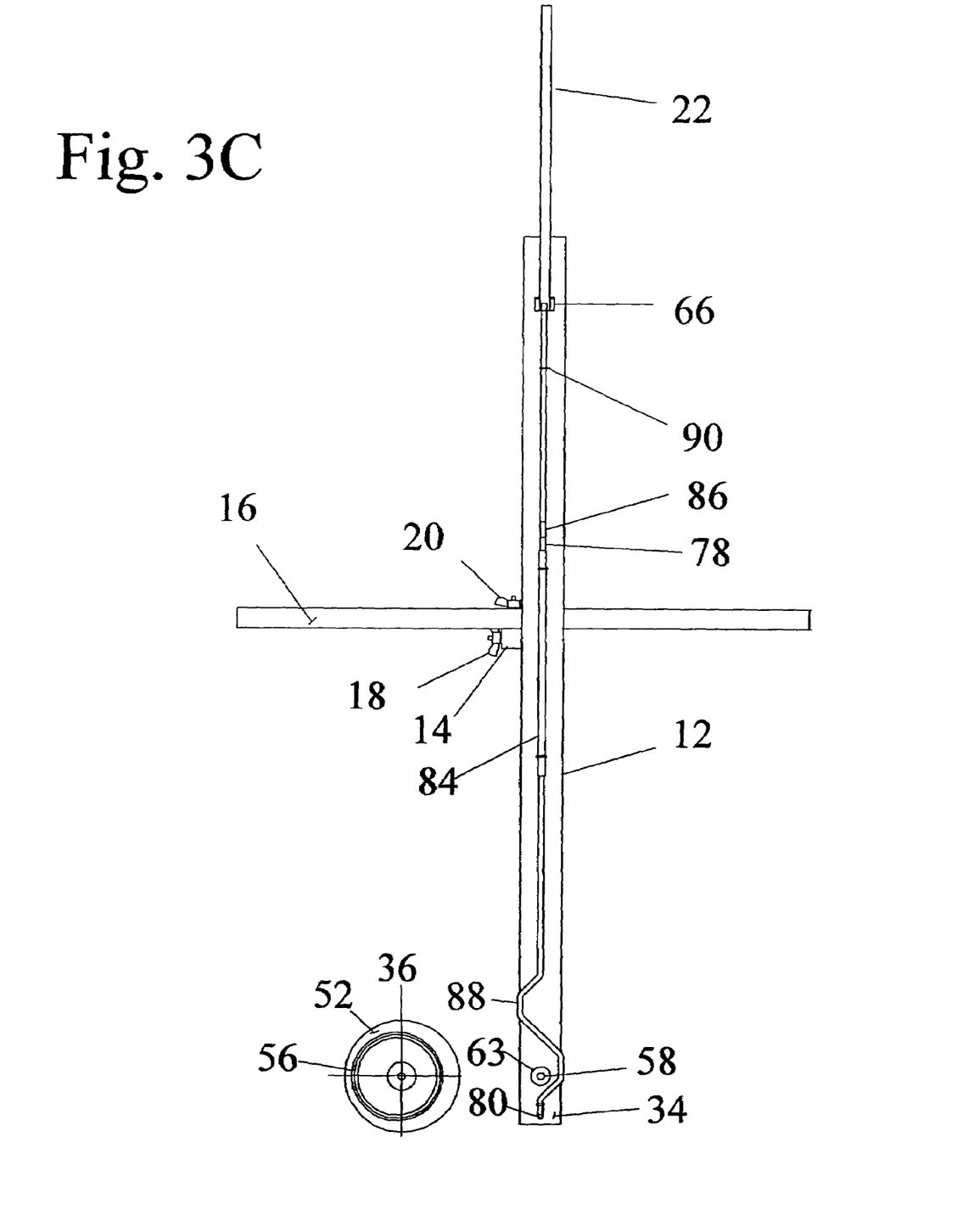
FIG. 3C is a diagrammatic left side elevational view of the ice fishing trap of FIG. 3 with the spool removed and flipped over to show the position of the eccentric rim.
Figures 4, 4A, 4B:
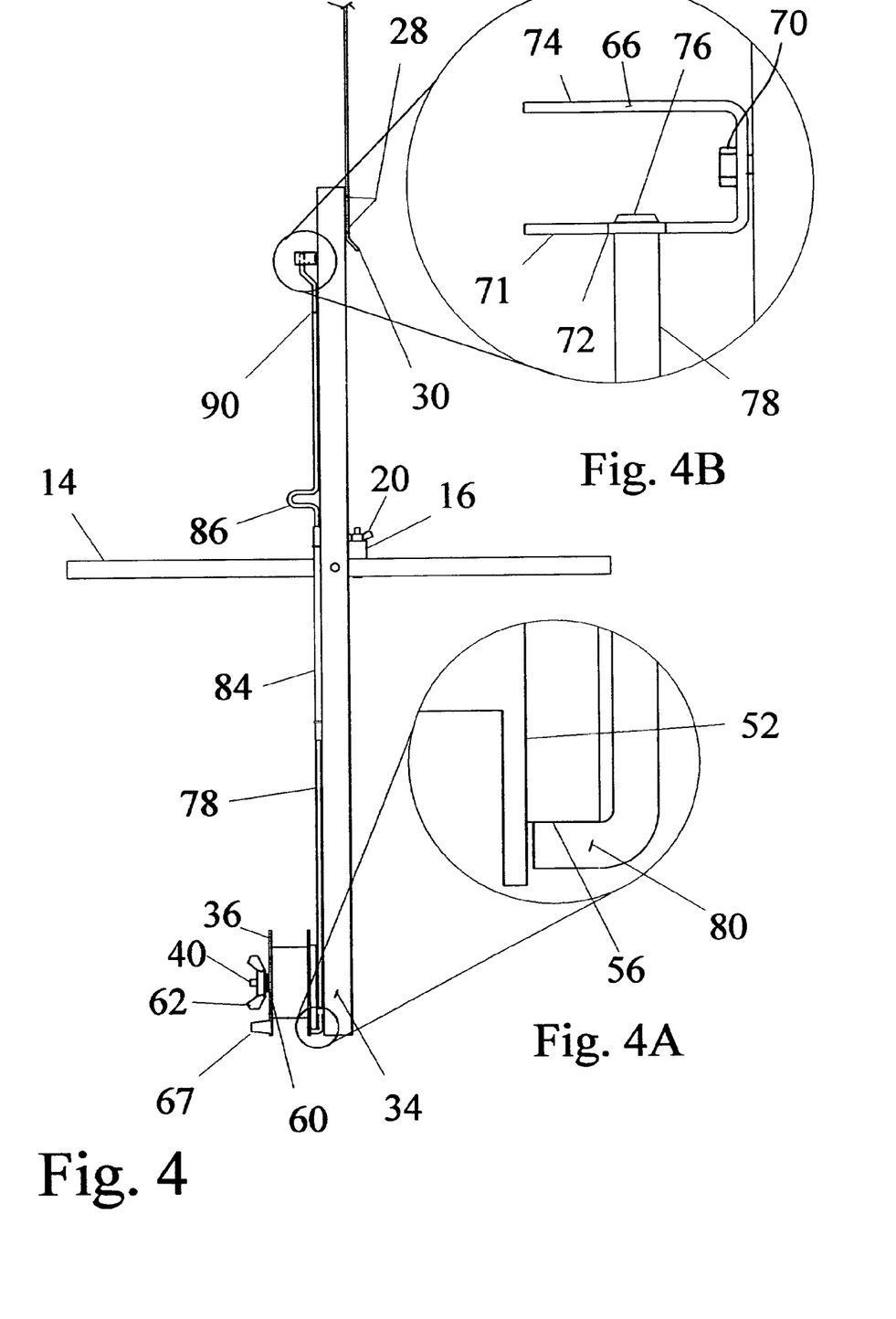
FIG. 4 is a diagrammatic front elevational view of the ice fishing trap showing the indicator in a released or triggered position.
FIG. 4A is a diagrammatic exploded view of the rider and spool components of FIG. 4.
FIG. 4B is a diagrammatic exploded view of the release rod and keeper components of FIG. 4.
Figure 4C:
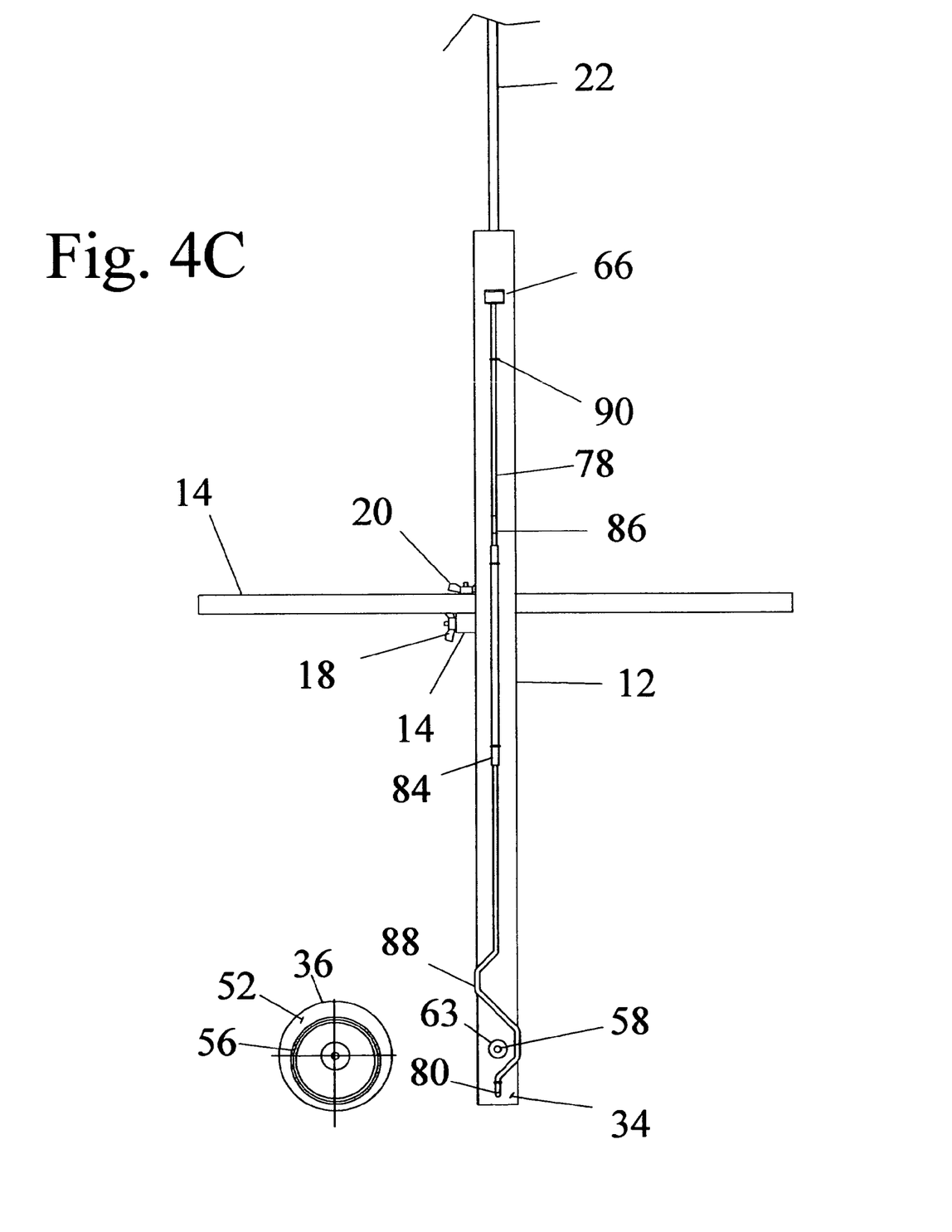
FIG. 4C is a diagrammatic left side elevational view of the ice fishing trap of FIG. 4 with the spool removed and flipped over to show the position of the eccentric rim.

In order to minimize contact between the release rod 78 and the spool shaft 40, the release rod 78 is provided with a generally Z shaped configuration 88 (see FIGS. 1C, 2C and 3C). This Z shaped configuration 88 allows release rod 78 to still move or travel axially along the main body 12, e.g., a limited distance of a few inches or so without hindering rotation of the spool 36 and without the spool shaft 40 obstructing axial movement, travel and operation of the release rod 78. In addition, the Z shaped configuration 88 of the release rod 78 helps ensure that the release rod 78 lies flat against the main body 12 which assists with preventing rotation of the rider 80 relative to the main body 12. That is, the Z shaped configuration 88 of the release rod 78 helps maintain the rider 80 in a substantially perpendicular orientation with respect to the main body 12 so that the rider 80 is always positioned for engagement with the eccentric rim 56 of the second sidewall of the spool 36. The Z shaped configuration 88 of the release rod 78 also assists, along with the push lever 86, with preventing the rider 80 from becoming spaced too far away from the elliptical rim 56 of the spool 36. If warranted or necessary, one or more conventional alignment members 90 may be utilized to secure the release rod 78 to the main body 12 while still allowing the desired axial movement or travel of the release rod 78 relative to the main body 12. The one or more alignment members 90 also help ensure that the latch 76 remains properly aligned with the aperture 72 of the keeper 66 and the rider 80 is properly aligned with the peripheral rim 56 of the spool 36. Generally the alignment members 90 and the sleeve 84 will provide enough friction to the release rod 78 so that it will not move vertically downward, when the ice fishing trap 10 is in a vertical orientation, solely due to the force of gravity. The rotational bore 50 for the second mating component is formed in a hub 51 (see FIG. 5) which facilitates spacing the spool 36 a sufficient distance away from the main body 12 and the release rod 78 to perming unobstructed rotation thereof.

The operation of the ice fishing trap 10 will now be described. An operator will travel to a desired fishing spot and will typically cut a desired hole in the ice in a conventional manner. Thereafter, the operator will pivot both legs 14, 16 to their deployed positions such that the legs 14, 16 are both oriented perpendicular to one another and the main body 12 and the main body 12 is oriented in a substantially vertical position and tighten the conventional fasteners 18, 20, as necessary, to maintain the legs 14, 16 in their deployed position. The operator will then place desired fishing tackle 42, such as a swivel, one or more sinkers, a hook, etc., to the leading free end of the fishing line 38 and then place suitable bait (not shown) on the hook. Thereafter, the operator will lower the bait through the hole in the ice and dispense a sufficient amount of fishing line 38 from the spool 36 so that the bait may be positioned at a desired depth in the water.

The operator will normally then grab the free end 25 of the indicator 22 and bend or curve that end of the indicator 22 so that it is received between the inwardly facing surfaces of the two sidewalls 71, 74 of the keeper 66. Once the free end 25 of the indicator 22 is so positioned, the operator will use the push lever 86 to bias the release rod 78 vertically upward toward opposite sidewall 74 of the keeper 66 so that the leading end of the latch 76 passes through the opening 32 in the indicator 22 and abuts with the opposite sidewall 74 of the keeper 66 to retain the indicator 22 in its set position. It is to be appreciated that the operator may possibly have to rotate the spool 36 so that the eccentric rim 56 of the spool 36 is in its rotational position which is closest to the keeper 66 (see FIG. 2C) so that the rider 80 of the release rod 78, which engages with the eccentric rim 56, does not prevent or unduly restrict vertical upward axial movement or travel of the release rod 78.

Once the indicator 22 is set, the operator will then position the base end 34 of the ice fishing trap 10 into the hole formed in the ice so that the spool 36 and the first portion of the tubular element or sleeve 84 are completely submerged under water with the ice fishing trap 10 resting upon the pair of legs 14, 16. Finally, the operator will ensure that the rider 80 is engaged with or located closely adjacent the eccentric rim 56 of the second sidewall 52 to ensure that rotation of the spool 36, and thus the eccentric rim 56, will induce vertically downward axial movement of the release rod 78. If the operator so desires, the spool 36 can be rotated a few degrees or so (see FIG. 3C, for example) to partially activate the trigger mechanism and render the ice fishing trap 10 more "sensitive"—this is especially beneficial when the operator is fishing for small fish, e.g., fish weighing under one pound or so. It is to be appreciated that the spool 36 may have to be rotated up to 180 degrees, in either rotational direction, before the latch 76 completely releases the indicator 22 and triggers the ice fishing trap 10, but generally less rotation of the spool 36 is required to trigger the indicator 22.

When a fish takes the bait and begins to swim off, the spool 36 will start rotating to unwinding additional fishing line 38 and such rotation of the spool 36, due to the eccentric feature of the spool 36, will induce the release rod 78 to move or travel axially and longitudinally along the main body 12, vertically downward away from the top end 24 of the body 12. Such movement or travel of the release rod 78 also moves the integral latch 76 a sufficient distance away from its abutting engagement with the opposite sidewall 74 of the keeper 66 and releases its engagement with the opening 32 of the indicator 22 so the free end 25 of the indicated 22 is no longer captively retained and thus is completely released from the keeper 66. Once this occurs, the indicator 22 and can then spring back toward its normal unbiased vertical orientation (see FIGS. 4 and 4C) and signal to an operator that the fish has taken the bait. Thereafter, the operator will visit the trap 10 and commence reeling in the fishing line 38 by operation of the spool 36 in a conventional manner. The operator will then either reel in the fish or may have to adjust or replace the bait if a significant portion of the bait was removed from the hook by the fish.

Figures 6, 6A, 6B:
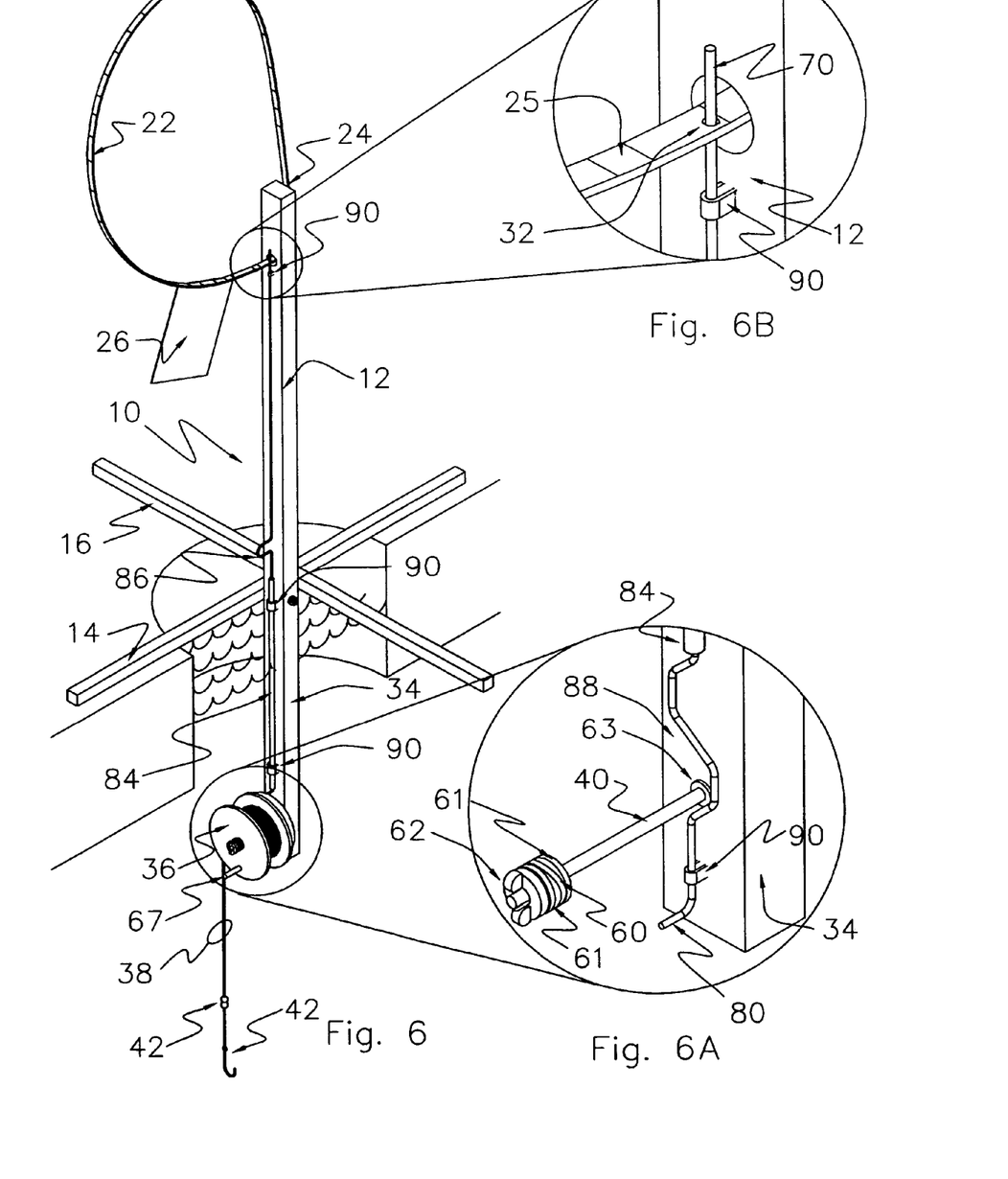
FIG. 6 is a diagrammatic perspective view showing another embodiment of the ice fishing trap in an in use and set position.
FIG. 6A is a diagrammatic exploded view of the rider and spool shaft components of FIG. 6 with the spool removed for reasons of clarity.
FIG. 6B is a diagrammatic exploded view of the release rod, keeper and indicator components of FIG. 6.

With reference to FIGS. 6-6B, an alternative arrangement of the present invention will now be described. The basic difference between this embodiment and the previous embodiment is a configuration of the keeper 66. According to this embodiment, the keeper 66 is a bore 92 provided in the main body 12 adjacent the top end 24 thereof. The bore 92 can be either a blind bore or a through bore depending upon the particular application. In either instance, the bore 92 is sized to easily receive the free end 25 of the indicator 22 and allow that end to pass into the bore 92 a sufficient distance so that the latch 76 of the release rod 78 can pass through the opening 32 therein and captively retain the indicator 22, as with the previous embodiment. An alignment member 90, such as a staple, a clamp, a screw eye, etc., is provided adjacent the bore 92 to assist with alignment between the latch 76 and the opening 32. In all other respects, this embodiment is the same and operates the same as the previously discussed embodiment. That is, when the release rod 78 is moved axially, the latch 76 is retracted from its engagement with the opening 32 to thereby release the indicator 22 and trigger the trap. The bore 92 assists with confining movement of the free end 25 of the indicator 22 during such axial movement of the release rod 78.

Figures 7, 7A, 7B:
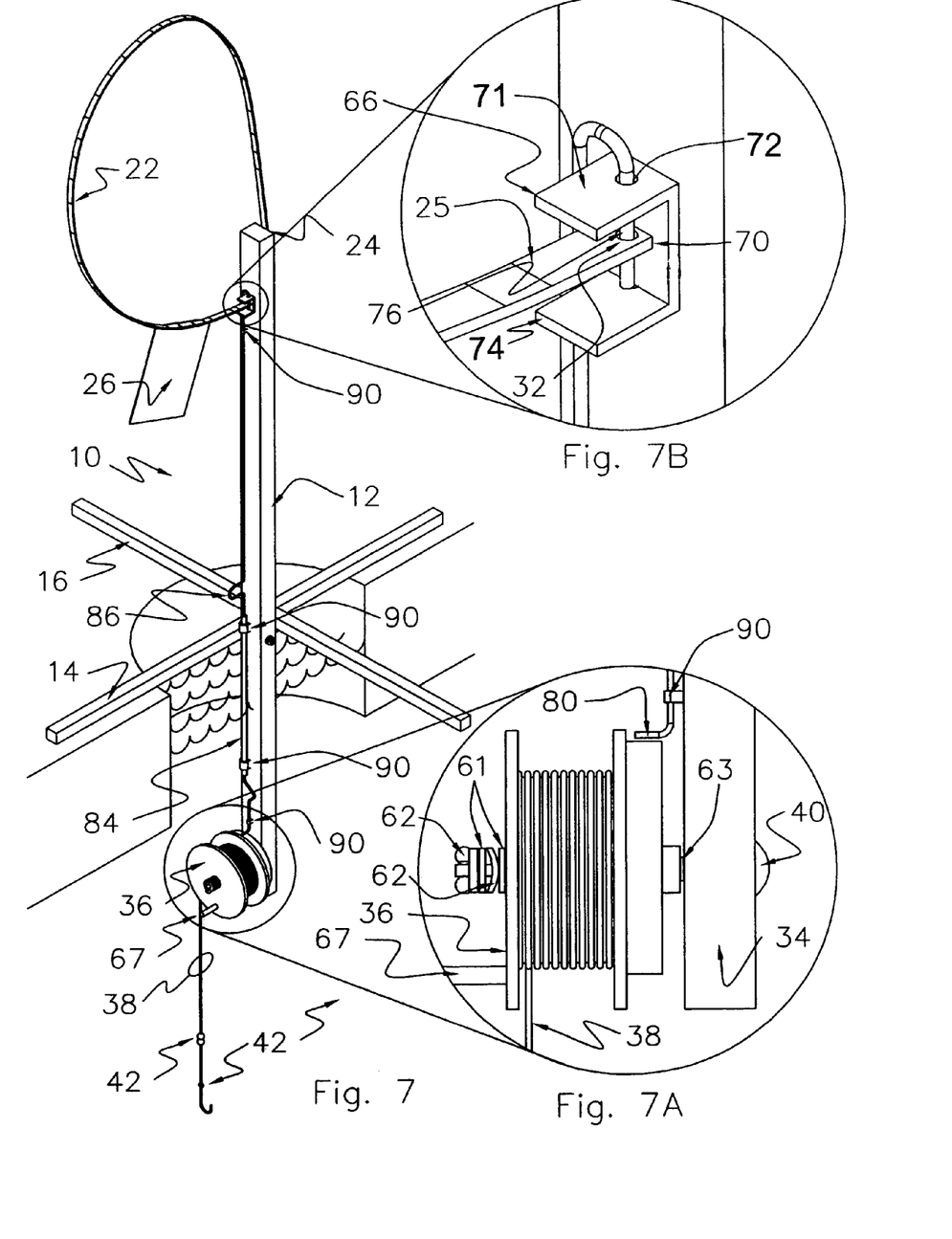
FIG. 7 is a diagrammatic perspective view showing a further embodiment of the ice fishing trap in an in use and set position.
FIG. 7A is a diagrammatic exploded view of the rider and spool shaft components of FIG. 7.
FIG. 7B is a diagrammatic exploded view of the release rod, keeper and indicator components of FIG. 7.

With reference to FIGS. 7-7B, a still further alternative arrangement of the present invention will now be described. The basic difference between this embodiment and the previous embodiment is a configuration of the release rod 78. According to this embodiment, the release rod 78 is entirely located between the spool 36 and the keeper 66 so that the rider 80 rides along a top vertically upper peripheral surface of the eccentric rim 56 of the spool 36 rather than along the bottom vertically lower peripheral surface of the eccentric rim 56 of the spool 36 as with both of the previous embodiments. As a result of this arrangement, the rider 80 is biased axially vertically upward away from the spool 36 and toward the top end 24 of the main body 12, upon rotation of the spool 36, rather than axially downward away from the top end 24 of the main body 12 as with the previous embodiment.

Due to such movement of the release rod 78, the latch 76 of the release rod 78 is also modified. According to this embodiment, the keeper 66 is secured to the main body in an inverted position. That is, the keeper 66 is still a U-shaped bracket and the latch 76 is hooked shaped. However, the first sidewall 71 is located vertically above, rather than vertically below, the opposite sidewall 74 and the latch 76 extends around the keeper 66 and then bends 180 degrees and extends vertically downward and passes through the aperture 72 in the first sidewall 71 and then through the opening 32 in the indicator 22 and finally abuts against the opposite sidewall 74, as discussed above, to captively retain the indicator, as discussed above. According to this embodiment, upon rotation of the spool 36, the release rod 78 and the latch 76 both moved vertically upward to release the indicator 22 and set the trap 10.

One advantage associated with this arrangement is that gravity will have a tendency to bias the rider 80 constantly downwardly into engagement with the top vertically upper peripheral surface of the eccentric rim 56 of the spool 36 and maintain such engagement between those two components. In all other respects, the release rod 78 is substantially similar to and operates in the manner discussed above.

Figures 8, 8A, 8B:
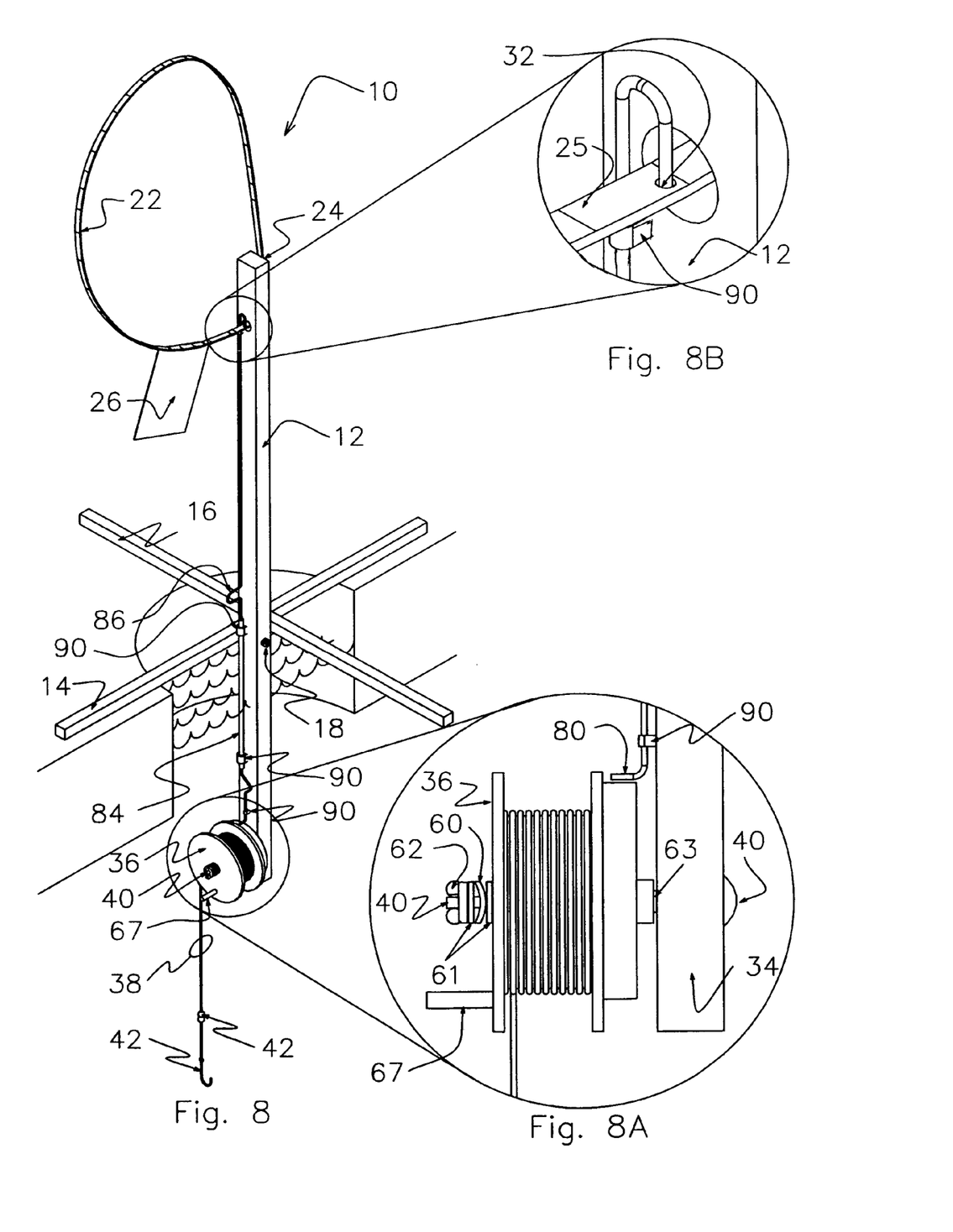
FIG. 8 is a diagrammatic perspective view showing a still further embodiment of the ice fishing trap in an in use and set position.
FIG. 8A is a diagrammatic exploded view of the rider and spool shaft components of FIG. 8.
FIG. 8B is a diagrammatic exploded view of the release rod, keeper and indicator components of FIG. 8.

With reference to FIGS. 8-8B, yet another alternative arrangement of the present invention will now be described. This embodiment is generally a combination of the second and third embodiments. As with the second embodiment, the keeper 66 is a bore 92 provided in the main body 12 adjacent the top end 24 thereof. The bore 92 can be either a blind bore or a through bore depending upon the particular application. In either instance, the bore 92 is sized to easily receive the free end 25 of the indicator 22 and allow that end to pass into the bore 92 a sufficient distance so that the latch 76 of the release rod 78 can pass through the opening 32 therein and captively retain the indicator 22, as with the previous embodiment. An alignment member 90 is provided adjacent the bore 92 to assist with alignment between the latch 76 and the opening 32.

As with the third embodiment, the release rod 78 is entirely located between the spool 36 and the bore 92 so that the rider 80 rides along a top vertically upper peripheral surface of the eccentric rim 56 of the spool 36 rather than along the bottom vertically lower peripheral surface of the eccentric rim 56 of the spool 36 as with the first two embodiments. As a result of this arrangement, the rider 80 is biased axially vertically upward away from the spool 36 and toward the top end 24 of the main body 12 upon rotation of the spool 36.

Due to such movement of the release rod 78, the latch 76 of the release rod 78 is modified. According to this embodiment, the latch 76 extends around the bore 92 and then curves and/or bends 180 degrees and extends vertically downward and passes through an alignment member 90 located vertically above the bore 92 so that the latch is properly located to pass through the opening 32 in the indicator 22, as discussed above, to captively retain the indicator 22. According to this embodiment, upon rotation of the spool 36, the release rod 78 and the latch 76 both moved vertically upward to release the indicator 22 and set the trap 10.

Although the present invention describes a number of ways of captively retaining the free end 25 of the indicator 22 so that the free end 25 is unaffected by wind, snow and other environmental conditions normally occurring during ice fishing, it is to be appreciated that there are a variety of other alternative arrangements which are also considered to be within the spirit and scope of the present invention. One aspect of the present invention is that axial movement of the release rod 78 releases the captively engaged free end of the indicator 22 to trigger the ice fishing trap 10 and indicate to an operator that the fish has taken the bait. Such axial movement results from the rotation of the spool 36 which causes the eccentric sidewall of the spool 36 to induce axial movement of the release rod 78 due to the rider 80 riding along the peripheral surface thereof and also inducing axial movement of the latch 76 to release the indicator 22 to its trigger position.

To further prevent the possibility of the water freezing between the exterior surface of the release rod 78 and the inwardly facing surface of the sleeve 84, a lubrication have a freezing temperature well below 32 degrees F. may be provided within the sleeve 84 between these two components. Alternatively, the sleeve 84 may be eliminated and the lower portion of the release rod 78 may be coated with TEFLON® or some other low friction coating or material to prevent or minimize the possibility of ice freezing to the release rod 78 and inhibiting movement thereof.

The release rod 78 and the eccentric rim 56 provided a fishing system in which the ice fishing trap 10 is only set or released by a steady and constant tug on the fishing line 38 as a fish takes the bait secured to the hook. As a result of this arrangement, the fish will not experience a sudden tug on the fishing line, as the fish takes the bait secured thereto and the trap is "set" to release the indicator, and thus the fish will not have a tendency to spit out the bait prior to swallowing the same.

It is to be appreciated that there are a variety of alternative embodiments, for captively retaining a free end 25 of the indicator 22 and for releasing the free end 25 of the indicator 22 as a result of axial movement of the release rod 78 which is triggered by rotation of the spool 36. According, such modifications and variations are considered to be within the spirit and scope of the present invention.

The fishing line 38 is typically a synthetic fishing line 38 and is preferably between five pound and 55 pound test line. The spool 36 is designed to accommodate between and 50 and 500 yards of fishing line 38.

Since certain changes may be made in the above described improved trigger mechanism for an ice fishing trap, without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. An ice fishing trap comprising:

a rotatable spool, for containing a desired length of fishing line, rotatable about a rotational axis, and the rotatable spool having an eccentric rim;

a main body having an exterior first face supporting the rotatable spool such that the rotational axis of the spool extends substantially normal to the exterior first face;

the main body supporting an indicator, and the indicator having both a set position and a triggered position;

a release rod, supported by and slidable along the exterior first face of the main body, directly cooperating with the eccentric rim of the rotatable spool and, when the indicator is in the set position, also directly cooperating with the indicator, the release rod having a first position in which the release rod captively retains the indicator in the set position and engages with the eccentric rim of the spool; and the release rod having a second position, axially spaced from the first position, in which the release rod releases the indicator to permit the indicator to move to the triggered position; wherein a first end of the release rod supports a rider which engages with and is actuated by the eccentric rim of the spool while the second opposed end of the release rod includes a latch for matingly engaging with the indicator and captively retaining the indicator in the set position, and the release rod has a Z shaped configuration which prevents rotation of the rider relative to the main body, so that the rider remains in a substantially perpendicular orientation with respect to the exterior first face of the main body to facilitate engagement between the rider and the eccentric rim;

an intermediate portion of the release rod being encased by a sleeve secured to the exterior first face of the main body; and the eccentric rim having a first arcuate section which is located closer to the rotational axis of the spool than a second arcuate section so that as the spool rotates, the eccentric rim rotates in an eccentric fashion about the rotational axis and induces axial movement of the release rod, along the exterior first face of the main body, from the first position to the second position and actuates the indicator into the triggered position.

2. The ice fishing trap according to claim 1, wherein the release rod is solely biased into the second position by the eccentric rim and the intermediate portion of the main body supports a pair of legs for retaining the main body in a substantially vertical use position.

3. The ice fishing trap according to claim 2, wherein the legs are pivotally attached to the main body and have a stowed positions, in which the legs extend substantially parallel to one another and a longitudinal axis of the main body and a deployed positions, in which the legs extends substantially perpendicular to one another and the longitudinal axis of the main body.

4. The ice fishing trap according to claim 1, wherein the indicator is an elongate spring member, and a first end of the spring member is attached to the main body and a second free end of the spring member carries a flag, and an aperture is provided in the second free end of the indicator through which the release rod passes to facilitate captive engagement of the indicator when the indicator is in the set position.

5. The ice fishing trap according to claim 1, wherein at least a portion of the spool has an eccentric rotational axis and the portion of the spool with the eccentric rotation axis induces axial movement of the release rod for releasing the indicator.

6. The ice fishing trap according to claim 2, wherein the main body and the legs are manufactured from one of wood, plastic and fiberglass.

7. The ice fishing trap according to claim 1, wherein the spool rotates about a spool shaft and, an axis along which the release rod slides when moving from the first position to the second position and vice versa, is substantially coincident with the rotational axis of the spool.

8. The ice fishing trap according to claim 1, wherein the spool includes a crank to facilitate rotation of the spool by an operator, and the release rod is freely slidable axially along the exterior first face of the main body between the first position and the second position and visa versa.

9. The ice fishing trap according to claim 1, wherein a first end of the release rod has a latch which engages with a keeper for captively retaining the indicator in the set position while a second end of the release rod has a rider which engages with the eccentric rim of the spool for inducing axial movement of the release rod.

10. The ice fishing trap according to claim 9, wherein the keeper is a bracket which has an aperture therein which allows the latch of the release rod to pass therethrough and abut against an inwardly facing surface of an opposite sidewall of the keeper to facilitate captively retaining the indicator.

11. The ice fishing trap according to claim 9, wherein the keeper is a bore provided in the main body adjacent one end thereof.

12. The ice fishing trap according to claim 11, wherein the bore is one of a blind bore and a through hole provided adjacent a top end of the main body.

13. The ice fishing trap according to claim 7, wherein the release rod only releases the indicator after a gradual and constant tug on the fishing line occurs, which is normally undetectable by a fish, when the fish takes bait secured to a remote end of the fishing line.

14. An ice fishing trap comprising:

rotatable spool, for containing a desired length of fishing line, rotatable about a rotational axis and having a circular eccentric rim;

a solid main body having an exterior first face supporting the rotatable spool such that the rotational axis of the spool extends substantially normal to the exterior first face;

the main body supporting an indicator, and the indicator having both a set position and a triggered position;

a release rod, supported by and slidable along the exterior first face of the main body, having a second end directly cooperating with the eccentric rim of the rotatable spool and, at least when the indicator is in the set position, the release rod also having a first end directly cooperating with both a keeper and the indicator, the release rod having a first position in which the release rod extends through an aperture in the keeper and an aperture in a first end of the indicator to captively retain the indicator in the set position and the release rod engages with the eccentric rim of the spool, the release rod having a second position, axially spaced from the first position, in which the release rod slides out of engagement with the aperture of the indicator, when activated by the eccentric rim, thereby releasing the indicator to permit the indicator to move to the triggered position; wherein the second end of the release rod supports a rider which engages with and is actuated by the eccentric rim of the spool while the first end of the release rod includes a latch for matingly engaging with the indicator and captively retaining the indicator in the set position, and the release rod has a Z shaped configuration which prevents rotation of the rider relative to the main body, so that the rider remains in a substantially perpendicular orientation with respect to the exterior first face of the main body to facilitate engagement between the rider and the eccentric rim;

an intermediate Portion of the release rod is encased by a sleeve secured to the exterior first face of the main body; and the eccentric rim being planar and a perimeter of the eccentric rim being located eccentrically with respect to the rotational axis of the spool and having a first arcuate section which is located closer to the rotational axis of the spool than a second arcuate section so that as the spool rotates, the perimeter of the eccentric rim rotates in an eccentric fashion, about the rotational axis, and induces axial sliding movement of the release rod, along the exterior first face of the main body, from the first position to the second position and actuates the indicator into the triggered position.

15. The ice fishing trap according to claim 14, wherein the intermediate portion of the main body supports a pair of legs for retaining the main body in a substantially vertical use position, and the legs are pivotally attached to the main body and have a stowed position, in which the legs extend substantially parallel to one another and a longitudinal axis of the main body, and a deployed position, in which the legs extends substantially perpendicular to one another and the longitudinal axis of the main body.

16. The ice fishing trap according to claim 14, wherein the first end of the release rod has a latch which cooperates with the keeper for captively retaining the indicator in the set position while the second end of the release rod has a rider which engages with the eccentric rim of the spool for inducing axial movement of the release rod.

17. The ice fishing trap according to claim 14, wherein the spool has a centrally located rotational bore formed therein and a sidewall of the spool has the eccentric rim which cooperates with the second end of the release rod for axially moving the release rod from the first position to the second position and actuating the indicator into the triggered position.

18. A method of actuating an ice fishing trap comprising a rotatable spool having an eccentric rim, the rotatable spool containing a desired length of fishing line and being rotatable about a rotational axis; a main body having an exterior first face supporting the rotatable spool; the main body supporting an indicator, and the indicator having both a set position and a triggered position; and a release rod directly cooperating with the eccentric rim of the rotatable spool and, when the indicator is in the set position, also directly cooperating with the indicator, the release rod being supported by and slidable along the exterior first face of the main body and the release rod having a first position in which a second end of the release rod protrudes through an aperture in first end of the indicator to captively retain the indicator in the set position and engages with the eccentric rim of the spool, the release rod having a second position, axially spaced from the first position, in which the release rod releases the indicator to permit the indicator to move to the triggered position, and rotation of the spool axially slides the release rod along the exterior first face of the main body, from the first position to the second position, to withdraw the second end of the release rod from the aperture in the first end of the indicator and actuate the indicator into the triggered position; and the release rod slides along a slide axis which is substantially normal to and coincident with the rotational axis of the spool; wherein a first end of the release rod supports a rider which engages with and is actuated by the eccentric rim of the spool while the second opposed end of the release rod includes a latch for matingly engaging with the indicator and captively retaining the indicator in the set position, and the release rod has a Z shaped configuration which prevents rotation of the rider relative to the main body, so that the rider remains in a substantially perpendicular orientation with respect to the exterior first face of the main body to facilitate engagement between the rider and the eccentric rim the method comprising the steps of:

securing bait to a free end of the fishing line;

moving the release rod axially along the exterior first face of the main body to the first position and captively engaging the indicator; and as the bait is being taken by a fish, gradually rotating the eccentric rim of the spool to move the release rod axially, along the exterior first face of the main body, from the first position to the second position thereby allowing the indicator to move to the triggered position.

* * * * *